(12) United States Patent
Bao et al.

(10) Patent No.: US 12,155,568 B2
(45) Date of Patent: Nov. 26, 2024

(54) PACKET PROCESSING METHOD AND APPARATUS, DEVICE, AND STORAGE MEDIUM

(71) Applicant: Huawei Technologies Co., Ltd., Shenzhen (CN)

(72) Inventors: Lei Bao, Nanjing (CN); Juhua Xu, Nanjing (CN); Zhibo Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/528,913

(22) Filed: Dec. 5, 2023

(65) Prior Publication Data

US 2024/0106749 A1 Mar. 28, 2024

Related U.S. Application Data

(63) Continuation of application No. 17/903,325, filed on Sep. 6, 2022, now Pat. No. 11,870,690, which is a (Continued)

(30) Foreign Application Priority Data

Mar. 17, 2020 (CN) .......................... 202010188162.8

(51) Int. Cl.
*H04L 45/00* (2022.01)
*H04L 43/067* (2022.01)

(52) U.S. Cl.
CPC .......... *H04L 45/566* (2013.01); *H04L 43/067* (2013.01); *H04L 45/20* (2013.01)

(58) Field of Classification Search
CPC ... H04L 47/78; H04L 47/2441; H04L 47/125; H04L 45/566; H04L 45/20; H04L 45/00; H04L 45/50; H04L 43/067
See application file for complete search history.

(56) References Cited

U.S. PATENT DOCUMENTS 7,486,678 B1 * 2/2009 Devanagondi ........ H04L 49/608
370/429
11,870,690 B2 * 1/2024 Bao .......................... H04L 47/78
(Continued)

FOREIGN PATENT DOCUMENTS

CN 104253767 A 12/2014
CN 106302229 A 1/2017
(Continued)

OTHER PUBLICATIONS

Dong, J., et al., "Carrying Virtual Transport Network (VTN) Identifier in IPV6 Extensison Header for Enhanced VPN", 6MAN working group, Internet-Draft, Intended status: Standard Track, Expires: Aug. 2020, Feb. 10, 2020, 8 Pages.
(Continued)

*Primary Examiner* — Shean Tokuta
(74) *Attorney, Agent, or Firm* — Slater Matsil, LLP

(57) ABSTRACT

This application provides a packet processing method and apparatus, a device, and a storage medium, and pertains to the field of communication technologies. In this application, a control identifier field is added to a packet, and the control identifier field indicates whether forwarding of the packet is allowed when the first network device does not configure the slice identifier on an outbound interface. The control identifier field and a slice identifier of a network slice are carried in the packet, so that the slice identifier and the control identifier field are transmitted on a network together. When a receive end does not configure the slice identifier on the outbound interface, the receive end can discard the packet based on the control identifier field, instead of forwarding the packet by using routing information.

26 Claims, 8 Drawing Sheets

Related U.S. Application Data continuation of application No. PCT/CN2021/080820, filed on Mar. 15, 2021.

(56) References Cited

U.S. PATENT DOCUMENTS

| | | | |
|---|---|---|---|
| 2013/0125230 A1* | 5/2013 | Koponen | H04L 41/0889 726/13 |
| 2018/0278496 A1* | 9/2018 | Kulshreshtha | H04L 43/04 |
| 2019/0174321 A1* | 6/2019 | Sun | H04W 16/02 |
| 2019/0281494 A1 | 9/2019 | Chan et al. | |
| 2020/0296007 A1* | 9/2020 | Finn | H04L 41/145 |
| 2020/0366607 A1* | 11/2020 | Kommula | H04L 45/20 |
| 2021/0067439 A1* | 3/2021 | Kommula | H04L 41/0895 |
| 2021/0083940 A1* | 3/2021 | Peng | H04L 47/803 |
| 2021/0289436 A1* | 9/2021 | Hu | H04L 41/40 |
| 2021/0314811 A1* | 10/2021 | Barton | H04L 41/0894 |
| 2022/0417144 A1* | 12/2022 | Bao | H04L 47/78 |
| 2023/0105168 A1* | 4/2023 | Nakamura | H04L 45/74 370/389 |
| 2023/0216786 A1* | 7/2023 | Ma | H04L 45/34 370/389 |
| 2023/0412508 A1* | 12/2023 | Li | H04L 47/829 |
| 2024/0031299 A1* | 1/2024 | Bao | H04L 45/308 |
| 2024/0106749 A1* | 3/2024 | Bao | H04L 45/308 |

FOREIGN PATENT DOCUMENTS

| | | |
|---|---|---|
| CN | 107172111 A | 9/2017 |
| CN | 107404441 A | 11/2017 |
| CN | 107517488 A | 12/2017 |
| CN | 109996306 A | 7/2019 |
| CN | 110535766 A | 12/2019 |
| CN | 110581812 A | 12/2019 |
| CN | 110662261 A | 1/2020 |
| CN | 113923161 A * | 1/2022 |
| EP | 3072263 B1 * | 10/2017 ......... G06F 9/45558 |
| EP | 3297227 A1 | 3/2018 |
| EP | 3461186 A1 | 3/2019 |
| EP | 3618505 A1 | 3/2020 |
| EP | 4106393 A1 * | 12/2022 ........... H04L 43/067 |
| JP | 2019532590 A * | 11/2019 |
| KR | 20230128564 A * | 9/2023 |
| WO | WO-2018006784 A1 * | 1/2018 ............ H04W 16/02 |
| WO | 2019065059 A1 | 4/2019 |
| WO | 2019128657 A1 | 7/2019 |
| WO | WO-2021166250 A1 * | 8/2021 ......... H04L 12/4625 |
| WO | WO-2021185208 A1 * | 9/2021 ............ H04L 43/067 |
| WO | WO-2022057810 A1 * | 3/2022 ........ H04L 41/0893 |
| WO | WO-2022188530 A1 * | 9/2022 ............. H04L 45/00 |
| WO | WO-2022247689 A1 * | 12/2022 ........ H04L 41/0893 |
| WO | WO-2023016566 A1 * | 2/2023 |

OTHER PUBLICATIONS

Huawei, et al., "Key Issues for Support of Network Slicing in RAN", 3GPP TSG-RAN WG2 NR Ad Hoc, R2-1700099, Nov. 17-19, 2017, 5 Pages, Spokane, Washington, USA.

"Identification of LTE-M (eMTC) traffic upon mobility from NR to E-UTRA in CM Connected", 3GPP TSG-SA2 Meeting #136, S2-1911905, Nov. 18, 2019-Nov. 22, 2019, 9 Pages, Reno, Nevada, United States.

* cited by examiner

PACKET PROCESSING METHOD AND APPARATUS, DEVICE, AND STORAGE MEDIUM

CROSS-REFERENCE TO RELATED APPLICATIONS

This application is a continuation of U.S. application Ser. No. 17/903,325, filed on Sep. 6, 2022, which is a continuation of International Application No. PCT/CN2021/080820, filed on Mar. 15, 2021, which claims priority to Chinese Patent Application No. 202010188162.8, filed on Mar. 17, 2020, all of which are incorporated herein by reference in their entireties.

TECHNICAL FIELD

This application relates to the field of communication technologies, and in particular, to a packet processing method and apparatus, a device, and a storage medium.

BACKGROUND

5th generation (5G) mobile networks are expected to provide different customized optimization capabilities for different services at the same time. Network slicing is a key concept to achieve this goal. Network slicing means that related service functions and network resources are organized together on a physical network to form a complete, autonomous, and independent operations and maintenance logical network, to meet specific user and service requirements. For example, one network slice provides a video service, another network slice provides a machine-to-machine (M2M) service, and another network slice provides an ultra-low delay autonomous driving service.

To ensure a service-level agreement (SLA) requirement of a service, a network device reserves a corresponding forwarding resource for each network slice in advance. Herein, the reserved forwarding resource is referred to as a reserved resource. In a packet forwarding process, a packet carries a slice identifier (ID) of a network slice. The network device matches, based on the slice identifier, a reserved resource corresponding to the slice identifier, and forwards the packet by using the reserved resource, to ensure an SLA.

In the packet forwarding process, if the network device cannot find the resource corresponding to the slice identifier, the network device forwards the packet based on routing information by default. Generally, forwarding the packet based on the routing information can only ensure service connectivity, but cannot ensure the SLA requirement.

SUMMARY

Embodiments of this application provide a packet processing method and apparatus, a device, and a storage medium, to help ensure an SLA requirement. The technical solutions are as follows:

According to a first aspect, a packet processing method is provided. In the method, a first network device receives a packet, where the packet includes a slice identifier of a network slice and a control identifier field. The control identifier field indicates whether forwarding of the packet is allowed when a resource corresponding to the slice identifier fails to be matched, and the first network device fails to match the resource corresponding to the slice identifier. The first network device discards the packet if a value of the control identifier field indicates that forwarding of the packet is not allowed when the reserved resource corresponding to the slice identifier fails to be matched.

In this method, the control identifier field is added to the packet, and the control identifier field indicates whether forwarding of the packet is allowed when the resource corresponding to the slice identifier fails to be matched. The control identifier field and the slice identifier of the network slice are carried in the packet, so that the slice identifier and the control identifier field are transmitted on a network together. When a receive end fails to match the resource corresponding to the slice identifier, the receive end can discard the packet based on the control identifier field, instead of forwarding the packet by using routing information, to avoid a problem that an SLA cannot be ensured when the packet enters a path corresponding to the routing information on the way.

Optionally, the resource is a reserved resource, and the reserved resource is a forwarding resource reserved for the network slice.

Optionally, the resource is an on-demand allocated resource.

Optionally, the packet includes a flag field, and the flag field includes the control identifier field.

Optionally, the packet includes a segment routing over internet protocol version 6 segment identifier SRv6 SID, and the SRv6 SID includes the control identifier field.

Optionally, the packet includes a type-length-value TLV, and the TLV includes the control identifier field.

Optionally, the packet includes a hop-by-hop options header, and the hop-by-hop options header includes the control identifier field; the packet includes a segment routing header SRH, and the SRH includes the control identifier field; the packet includes a slice identifier information head, and the slice identifier information head includes the control identifier field; the packet includes an internet protocol version 4 IPv4 packet header, and the IPv4 packet header includes the control identifier field; the packet includes an internet protocol version 6 IPv6 packet header, and the IPv6 packet header includes the control identifier field; or the packet includes a payload, and a structure in the payload includes the control identifier field.

Optionally, the control identifier field occupies one bit of the packet, and if the bit is set, it indicates that forwarding of the packet is not allowed when the resource corresponding to the slice identifier fails to be matched; or if the bit is not set, it indicates that forwarding of the packet is allowed when the resource corresponding to the slice identifier fails to be matched.

Optionally, the packet includes a detection packet.

Optionally, the packet includes a data packet.

Optionally, when the packet includes the detection packet, the detection packet is a bidirectional forwarding detection BFD packet.

In this optional manner, because the BFD detection packet is discarded by an intermediate node and is not transmitted to a target node, an ingress node cannot receive a feedback from the target node, the ingress node detects a packet loss, and the ingress node is triggered to perform path switching. Therefore, path switching is performed in a more timely manner, and reliability is improved.

Optionally, when the packet includes the detection packet, the detection packet is an operations, administration, and maintenance OAM detection packet.

Optionally, when the packet includes the detection packet, the detection packet is a two-way active measurement protocol TWAMP detection packet.

Optionally, when the packet includes the detection packet, the detection packet is a channel-associated OAM performance measurement iFit packet based on an internetworking protocol data flow.

According to a second aspect, a packet processing method is provided. In the method, a second network device generates a packet, where the packet includes a slice identifier of a network slice and a control identifier field. The control identifier field indicates whether forwarding of the packet is allowed when a resource corresponding to the slice identifier fails to be matched. The second network device sends the packet.

Optionally, the resource is a reserved resource, and the reserved resource is a forwarding resource reserved for the network slice.

Optionally, the resource is an on-demand allocated resource.

Optionally, after the second network device sends the packet, the method further includes at least one of the following: The second network device switches a path corresponding to the network slice in response to a case in which the packet is discarded; or the second network device sends an alarm message in response to a case in which the packet is discarded.

Optionally, the packet includes a flag field, and the flag field includes the control identifier field.

Optionally, the packet includes a segment routing over internet protocol version 6 segment identifier SRv6 SID, and the SRv6 SID includes the control identifier field.

Optionally, the packet includes a type-length-value TLV, and the TLV includes the control identifier field.

Optionally, the packet includes a hop-by-hop options header, and the hop-by-hop options header includes the control identifier field; the packet includes a segment routing header SRH, and the SRH includes the control identifier field; the packet includes a slice identifier information head, and the slice identifier information head includes the control identifier field; the packet includes an internet protocol version 4 IPv4 packet header, and the IPv4 packet header includes the control identifier field; the packet includes an internet protocol version 6 IPv6 packet header, and the IPv6 packet header includes the control identifier field; or the packet includes a payload, and a structure in the payload includes the control identifier field.

Optionally, the control identifier field occupies one bit of the packet, and if the bit is set, it indicates that forwarding of the packet is not allowed when the resource corresponding to the slice identifier fails to be matched; or if the bit is not set, it indicates that forwarding of the packet is allowed when the resource corresponding to the slice identifier fails to be matched.

Optionally, the packet includes a detection packet.

Optionally, the packet includes a data packet.

Optionally, when the packet includes the detection packet, the detection packet is a bidirectional forwarding detection BFD packet.

Optionally, when the packet includes the detection packet, the detection packet is an operations, administration, and maintenance OAM detection packet.

Optionally, when the packet includes the detection packet, the detection packet is a two-way active measurement protocol TWAMP detection packet.

Optionally, when the packet includes the detection packet, the detection packet is a channel-associated OAM performance measurement iFit packet based on an internetworking protocol data flow.

According to a third aspect, a packet processing apparatus is provided. The packet processing apparatus has a function of implementing packet processing in any one of the first aspect or the optional manners of the first aspect. The packet processing apparatus includes at least one module, and the at least one module is configured to implement the packet processing method provided in any one of the first aspect or the optional manners of the first aspect. For specific details of the packet processing apparatus provided in the third aspect, refer to any one of the first aspect or the optional manners of the first aspect. Details are not described herein again.

According to a fourth aspect, a packet processing apparatus is provided. The packet processing apparatus has a function of implementing packet processing in any one of the second aspect or the optional manners of the second aspect. The packet processing apparatus includes at least one module, and the at least one module is configured to implement the packet processing method provided in any one of the second aspect or the optional manners of the second aspect. For specific details of the packet processing apparatus provided in the fourth aspect, refer to any one of the second aspect or the optional manners of the second aspect. Details are not described herein again.

According to a fifth aspect, a first network device is provided. The first network device includes a processor and a communication interface. The communication interface is configured to receive a packet, and the processor is configured to execute instructions, so that the first network device performs the packet processing method provided in any one of the first aspect or the optional manners of the first aspect. For specific details of the first network device provided in the fifth aspect, refer to the any one of the first aspect or the optional manners of the first aspect. Details are not described herein again.

According to a sixth aspect, a second network device is provided. The second network device includes a processor and a communication interface. The communication interface is configured to send a packet, and the processor is configured to execute instructions, so that the second network device performs the packet processing method provided in any one of the second aspect or the optional manners of the second aspect. For specific details of the second network device provided in the sixth aspect, refer to the any one of the second aspect or the optional manners of the second aspect. Details are not described herein again.

According to a seventh aspect, a computer-readable storage medium is provided. The storage medium stores at least one instruction. When the instruction is read by a processor, a first network device is enabled to perform the packet processing method provided in any one of the first aspect or the optional manners of the first aspect.

According to an eighth aspect, a computer-readable storage medium is provided. The storage medium stores at least one instruction. When the instruction is read by a processor, a second network device is enabled to perform the packet processing method provided in any one of the second aspect or the optional manners of the second aspect.

According to a ninth aspect, a computer program product is provided. When the computer program product is run on a first network device, the first network device is enabled to perform the packet processing method provided in any one of the first aspect or the optional manners of the first aspect.

According to a tenth aspect, a computer program product is provided. When the computer program product is run on a second network device, the second network device is enabled to perform the packet processing method provided in any one of the second aspect or the optional manners of the second aspect.

According to an eleventh aspect, a chip is provided. When the chip is run on a first network device, the first network device is enabled to perform the packet processing method provided in any one of the first aspect or the optional manners of the first aspect.

According to a twelfth aspect, a chip is provided. When the chip is run on a second network device, the second network device is enabled to perform the packet processing method provided in any one of the second aspect or the optional manners of the second aspect.

According to a thirteenth aspect, a packet processing system is provided. The packet processing system includes a first network device and a second network device. The first network device is configured to perform the method in any one of the first aspect or the optional manners of the first aspect, and the second network device is configured to perform the method in any one of the second aspect or the optional manners of the second aspect.

DETAILED DESCRIPTION OF ILLUSTRATIVE EMBODIMENTS

Figure 1:
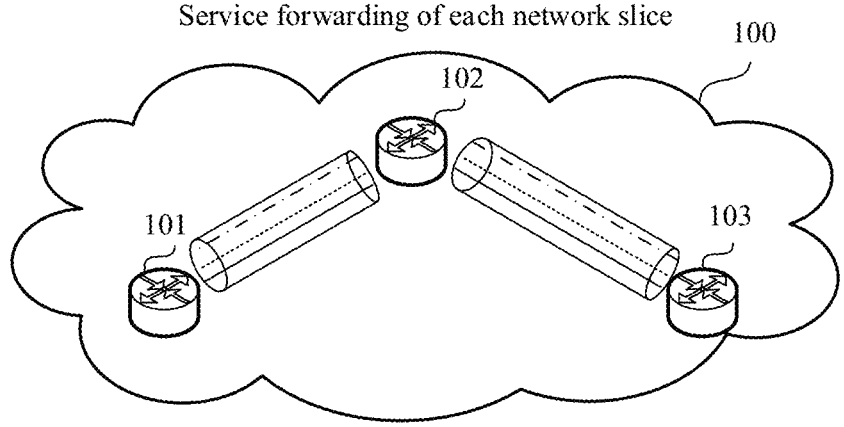
FIG. 1 is a schematic diagram of an application scenario according to an embodiment of this application.

To make the objectives, technical solutions, and advantages of this application clearer, the following further describes embodiments of this application in detail with reference to the accompanying drawings.

In this application, the terms "first", "second", and the like are used to distinguish between same or similar items whose effects and functions are basically the same. It should be understood that there is no logical or time-sequence dependency between "first", "second", and "$n_{th}$", and a quantity and an execution sequence are not limited, either. It should also be understood that although terms such as "first" and "second" are used in the following descriptions to describe various elements, these elements should not be limited by the terms. These terms are merely used to distinguish one element from another element. For example, without departing from the scope of the examples, a first network device may also be referred to as a second network device. Similarly, the second network device may also be referred to as the first network device. Both the first network device and the second network device may be network devices, and in some cases, may be separate and different network devices.

It should be further understood that the term "if" may be interpreted as meaning "when" ("when" or "upon"), "in response to determining", or "in response to detecting". Similarly, based on the context, the phrase "if it is determined that" or "if (a stated condition or event) is detected" may be interpreted as meaning "when it is determined that", "in response to determining", "when (a stated condition or event) is detected", or "in response to detecting (a stated condition or event)".

The following describes an application scenario of this application as an example.

A packet processing method provided in embodiments of this application can be applied to a scenario in which a service is carried based on a network slice in a 5G network. Optionally, the packet processing method in embodiments of this application can be applied to a bidirectional forwarding detection (BFD) detection scenario, an operations, administration, and maintenance (OAM) detection scenario, a two-way active measurement protocol (TWAMP) detection scenario, a channel-associated OAM performance measurement in-situ Flow information Telemetry (iFit) scenario based on an internetworking protocol data flow, or a data packet transmission scenario. The packet processing method in embodiments of this application can be applied to any scenario in which a packet is transmitted in a source routing-based manner, including but not limited to a segment routing over internet protocol version 6 (SRv6) scenario, a multi-protocol label switching (MPLS) scenario, a segment routing multi-protocol for label switching (SR-MPLS) scenario, or another scenario.

The following briefly describes concepts related to network slicing.

Network slicing means that related service functions and network resources on a physical network are organized to form a complete, autonomous, and independent operations and maintenance logical network. Based on a network slicing technology, a plurality of isolated virtual networks having independent management, independent control, and independent forwarding functions can be formed on a physical network to support services having differentiated bearer requirements. Therefore, network slicing has become a key technology in a future network architecture.

Resource: In the network slicing technology, physical resources of a network are logically abstracted to form mutually isolated, independent, and manageable virtual resources, so that network resources are divided and mapped. Based on this, the logical virtual network resources are combined through network slicing management to form a logical network isolated from another network slice. Theoretically, these resources may be any unit on a physical network, and may be a network element, a board, a port, a logical port/sub-port, a service instance, a forwarding table, a queue, a buffer, a CPU resource, and the like. Physical resources of a physical network include a node device, a computing storage resource, a fiber link, and the like. Physical network resources are first logically abstracted as different mutually isolated virtual resources, where the resources may be divided based on an interface, a board, and a network element. A link resource is also virtually abstracted in a bandwidth manner of a physical interface, a sub-interface, or a flexible Ethernet (Flex Eth or FlexE) interface.

A slice identifier (network slice identifier) identifies a corresponding network slice. A slice identifier carried in a packet may indicate a network slice to which the packet belongs. Optionally, a slice identifier is globally unique. In other words, a slice identifier carried in a packet may remain unchanged in a forwarding process.

In a 5G network, a corresponding forwarding resource is planned for each network slice in advance, and each forwarding node in the network reserves a corresponding forwarding resource for each network slice. In a forwarding process, different services enter different network slices, and a service flow of each network slice carries a slice identifier of the corresponding network slice. When the service flow arrives at each forwarding node on the network, the forwarding node first finds a physical outbound interface based on queried routing information, finds resources corresponding to the network slice on the physical outbound interface based on the slice identifier in the service flow, and forwards the service flow based on the resources. In this way, a service-level agreement (SLA) is ensured.

For example, FIG. 1 is a schematic diagram of an application scenario according to an embodiment of this application. A network system 100 includes three forwarding nodes: a forwarding node 101, a forwarding node 102, and a forwarding node 103. In the network system 100, corresponding paths are separately planned for three network slices in advance. In FIG. 1, different lines are used to represent paths corresponding to different network slices. For example, a path A is planned for a network slice 1, a path B is planned for a network slice 2, and a path C is planned for a network slice 3. Optionally, the paths planned for the different network slices pass through same forwarding nodes. For example, the path A, the path B, and the path C each is from the forwarding node 101, the forwarding node 102, to the forwarding node 103. The forwarding node 101 is an ingress node of the path A, the path B, and the path C, the forwarding node 102 is an intermediate node of the path A, the path B, and the path C, and the forwarding node 103 is an egress node of the path A, the path B, and the path C. Certainly, the paths planned for the different network slices may alternatively pass through different forwarding nodes.

The network system boo plans different forwarding resources for the network slice 1, the network slice 2, and the network slice 3. In other words, a resource corresponding to the path A, a resource corresponding to the path B, and a resource corresponding to the path C are different. For example, a service priority of the network slice 1 is higher than a service priority of the network slice 2, and the service priority of the network slice 2 is higher than a service priority of the network slice 3. In this case, a bandwidth of the forwarding resource planned for the network slice 1 is greater than a bandwidth of the forwarding resource planned for the network slice 2, and the bandwidth of the forwarding resource planned for the network slice 2 is greater than a bandwidth of the forwarding resource planned for the network slice 3, so that the bandwidth of the resource corresponding to the path A is higher than the bandwidth of the resource corresponding to the path B, the bandwidth of the resource corresponding to the path B is higher than the bandwidth of the resource corresponding to the path C. For example, a service of the network slice 1 is transmitted. When a service flow 1 of the network slice 1 enters the network system 100, each packet in the service flow 1 always carries a slice identifier of the network slice 1. When a packet of the service flow 1 passes through the forwarding node 101, the forwarding node 102, and the forwarding node 103 in sequence, the forwarding node 101, the forwarding node 102, and the forwarding node 103 each may obtain the slice identifier of the network slice 1 from the packet, find a resource corresponding to the network slice 1 based on the slice identifier, and forward the service flow 1 by using the resource, to ensure that the service flow 1 is transmitted on the path A having a maximum bandwidth.

However, when the service flow is forwarded, if the forwarding node cannot match, based on the slice identifier, the resource corresponding to the slice identifier, the forwarding node forwards the packet based on routing information. Because the packet is transmitted to a target node through a path corresponding to the routing information, service connectivity is ensured. However, although the service connectivity is ensured in a forwarding process based on the routing information, because forwarding is not performed from an interface on which a resource is reserved, the service may be affected by another service. As a result, a service SLA of a network slice cannot be ensured. In addition, the ingress node cannot detect whether the service matches a resource hop by hop. A high-value service has a high SLA requirement, and the current solution cannot meet a carrier-class requirement. However, in some embodiments of this application, a control identifier field is added to a packet. If a forwarding node does not match a resource corresponding to a slice identifier, the forwarding node discards the packet as indicated by the control identifier field, instead of forwarding the packet based on routing information. Therefore, it can be ensured that a service flow reaches a corresponding resource on each forwarding node. Otherwise, a packet of the service flow is discarded.

The following briefly describes some terms.

An SLA is an agreement signed between a service provider and a user or between different service providers. The SLA specifies a service level and quality provided by the service provider. In the field of telecommunication network technologies, SLA parameters or performance indicators usually include a delay, a bandwidth, a throughput rate, availability, a packet loss rate, and the like. In a scenario in which SLA assurance is required, a stable bandwidth and delay assurance are required for an end to end service.

BFD is used to quickly detect and monitor forwarding connectivity of a link on a network. An implementation principle of the BFD is as follows: A source node sends a detection packet. After receiving the detection packet, a target node responds. After the source node receives a response packet, it is considered that detection is successful. After a BFD session is established between the source node and the target node, a BFD detection packet is sent once every preset duration.

OAM is mainly used to monitor path connectivity and quickly detect a fault.

A slice identifier information head is a packet header used to carry a slice identifier. Optionally, a slice identifier information head is referred to as a slice ID information head, SIH, and the slice identifier information head may further carry information other than a slice identifier of the network slice.

A slice TLV refers to a type-length-value (TLV) that carries a slice identifier. A value field of the slice TLV includes the slice identifier. Optionally, the slice TLV further carries information related to another network slice in addition to the slice identifier. Optionally, the slice TLV is a new top TLV, and a value of a type field of the slice TLV indicates a type of an unused top TLV. Optionally, the slice TLV is a new sub-TLV of a top TLV, and a value of a type field of the slice TLV indicates a type of an unused sub-TLV. Optionally, the slice TLV is a new sub-sub-TLV of a top TLV, and a type of the slice TLV is a type of an unused sub-sub-TLV. Whether the slice TLV is a top TLV, a sub-TLV, or a sub-sub-TLV is not limited in this embodiment.

TWAMP is a performance measurement technology for an internet protocol (IP) link between networks, and can be used to perform bidirectional performance statistics in both directions. TWAMP uses a user datagram protocol (UDP) data packet as a measurement probe to collect statistics about a two-way network delay and jitter. In addition, the protocol is secure and can ensure separation of control and measurement functions. Through cooperation between network devices with TWAMP deployed, IP performance statistics data between devices can be effectively obtained.

iFit is an in-band flow measurement technology based on real service flows. The iFit technology is used to mark (color) actual service flows, perform in-situ flow packet loss and delay measurement based on feature fields, and provide end to end and hop-by-hop SLA measurement capabilities for IP service flows. This technology can quickly detect network faults and accurately demarcate and rectify faults, and it is an important means of operations and maintenance for future 5G mobile bearer networks.

The following describes a system architecture provided in embodiments of this application.

Figure 2:
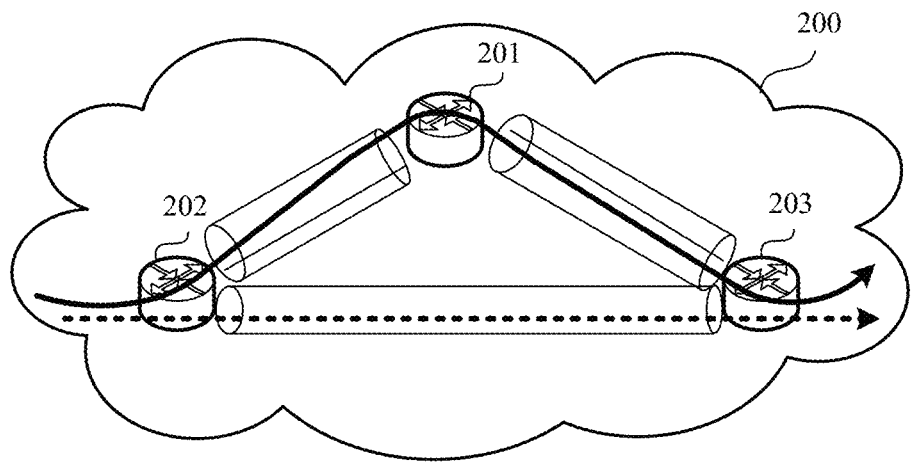
FIG. 2 is a diagram of an architecture of a packet processing system 200 according to an embodiment of this application.

Refer to FIG. 2. An embodiment of this application provides a packet processing system 200. The packet processing system 200 includes a plurality of forwarding nodes. The plurality of forwarding nodes are, for example, a forwarding node 201, a forwarding node 202, and a forwarding node 203. Different forwarding nodes in the packet processing system 200 are connected to each other by using a network.

In a forwarding process of a packet in the network system 200, the packet may be transmitted on different paths. A path in the network system 200 includes at least one of a path corresponding to a network slice or a forwarding path based on routing information. For example, refer to FIG. 2. The network system 200 includes a path a and a path b. The path a is an example of the path corresponding to the network slice, and the path b is an example of the forwarding path based on the routing information. The path a is from the forwarding node 202, the forwarding node 201, to the forwarding node 203. The forwarding node 202 is an ingress node of the path a, the forwarding node 201 is an intermediate node of the path a, and the forwarding node 203 is an egress node of the path a. The path b is from the forwarding node 202 to the forwarding node 203. The forwarding node 202 is an ingress node of the path b, and the forwarding node 203 is an egress node of the path b.

Optionally, the packet processing system 200 is an IP network system, and the forwarding node in the packet processing system 200 is a layer-3 network device. The layer-3 network device is, for example, a switch or a router. Alternatively, the packet processing system 200 is an optical network system, and the forwarding node in the packet processing system 200 is an optical network device. The optical network device is, for example, an optical transport network (OTN) device or an optical cross-connect (OXC) device.

The foregoing describes the system architecture by using an example, and the following describes a method procedure of forwarding a packet based on the system architecture by using an example. In method embodiments of this application, it is described how a forwarding node forces, by using a control identifier field, a packet to be transmitted on a path corresponding to a network slice, and the packet is not allowed to be transmitted on a path formed through forwarding based on routing information. For example, in the packet processing system 200 shown in FIG. 2, it is described how the control identifier field is used to force the packet to be transmitted on the path a and the packet is not allowed to be transmitted on the path b.

Embodiment 1

Figure 3:
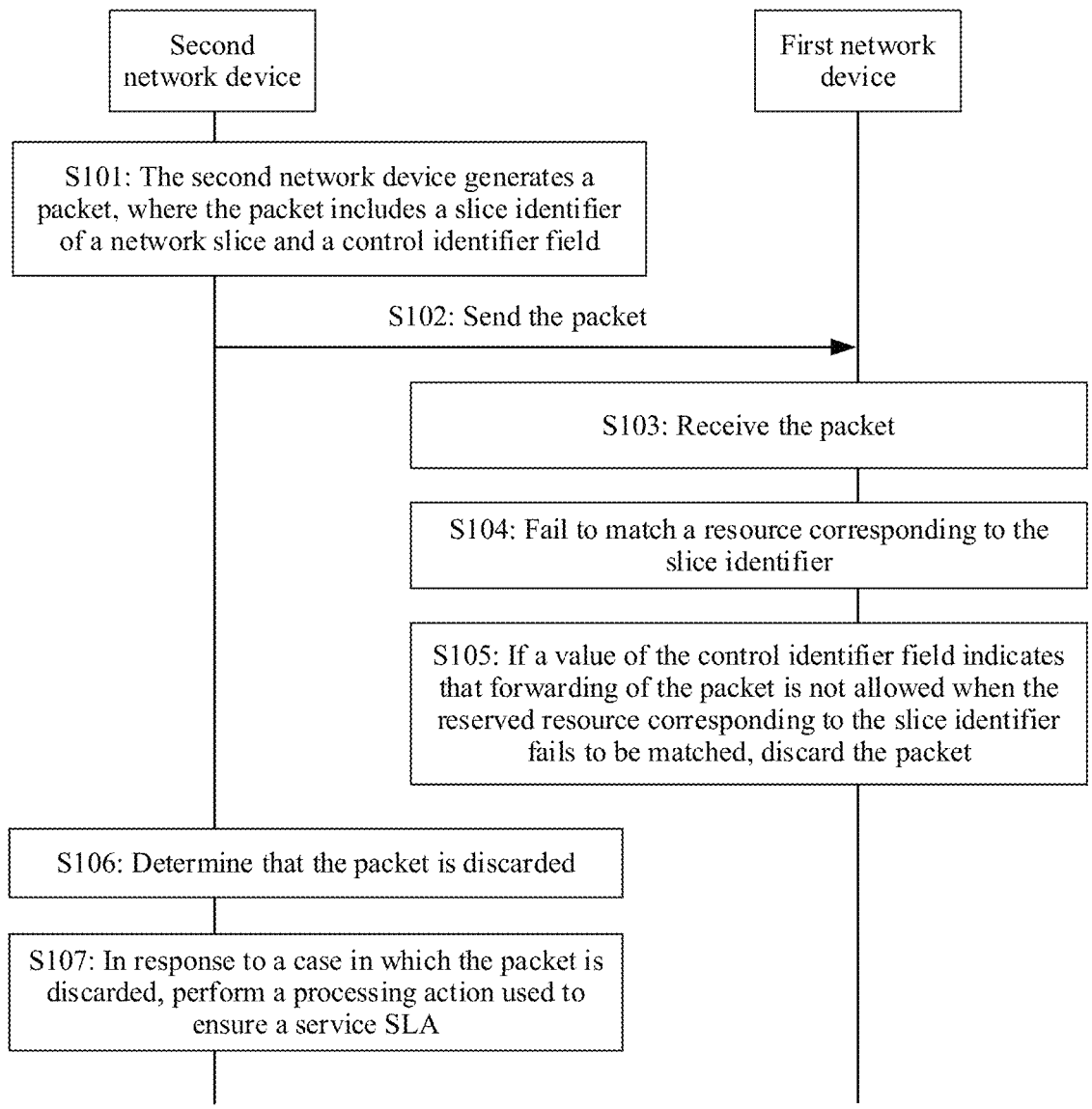
FIG. 3 is a flowchart of a packet processing method according to an embodiment of this application.

FIG. 3 is a flowchart of a packet processing method according to an embodiment of this application. Embodiment 1 includes the following S101 to S107. Optionally, S101, S102, S106, and S107 in Embodiment 1 are performed by a same network device, and S103 to S105 are performed by another network device.

Optionally, Embodiment 1 is processed by a central processing unit (CPU). Optionally, Embodiment 1 is processed by a network processor (NP). Optionally, Embodiment 1 is jointly processed by a CPU and an NP. Optionally, in Embodiment 1, a CPU or an NP may not be used, but another processor suitable for packet forwarding is used, for example, a field-programmable gate array (FPGA) chip or another application-specific integrated circuit (ASIC) chip is used for processing. This is not limited in this application.

S101: A second network device generates a packet.

In this embodiment, a control identifier field is added to the packet, and a multi-side interaction procedure performed by a forwarding plane of a network slice for the control identifier field is described. To distinguish and describe different network devices, an example in which the second network device serves as a transmit end of the packet and a first network device serves as a receive end of the packet is used for description. Optionally, the second network device is an ingress node, and the first network device is an intermediate node. For example, in the scenario shown in FIG. 1, the second network device may be the forwarding node 101, and the first network device may be the forwarding node 102. In the scenario shown in FIG. 2, the second network device may be the forwarding node 202 in the packet processing system 200, and the first network device is the forwarding node 201 in the packet processing system 200.

In a process of generating the packet, the second network device includes a slice identifier of the network slice and the control identifier field together in the packet, so that the packet includes the slice identifier of the network slice and the control identifier field. Therefore, the control identifier field is forwarded on the way along with the slice identifier on a network. For example, the packet carrying the control identifier field includes but is not limited to one or a combination of a plurality of a conventional IPv6 packet, an MPLS packet, an SR packet, a BFD packet, an iFit packet, an OAM detection packet, or a data packet. The SR packet includes either an SR-MPLS packet or an SRv6 packet.

How the second network device includes the slice identifier in the packet includes a plurality of implementations. The following describes, by using examples with reference to Case 1 to Case 3, optional solutions for including the slice identifier.

Case 1: The packet is the SRv6 packet.

Figure 4:
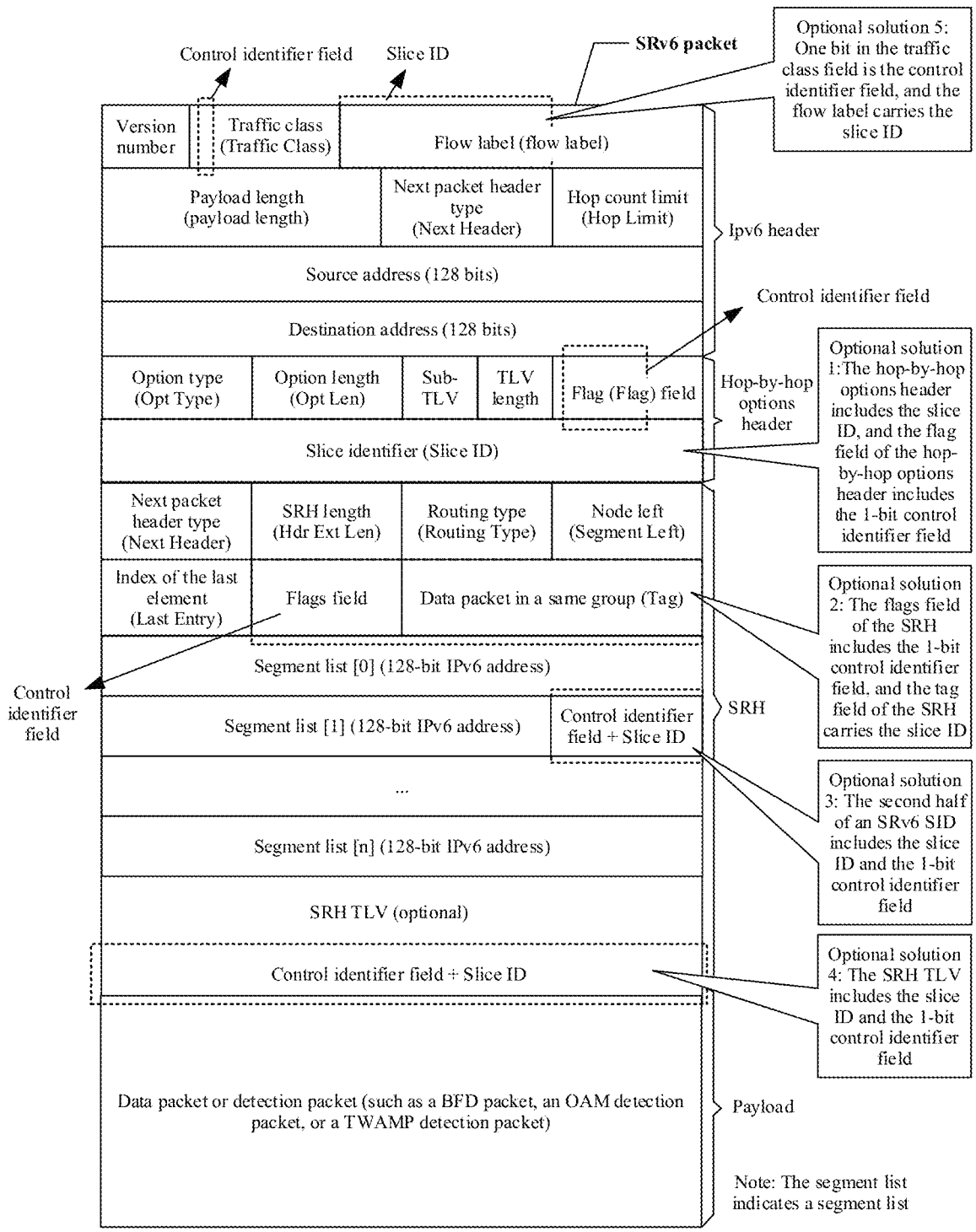
FIG. 4 is a schematic diagram of an SRv6 packet according to an embodiment of this application.

FIG. 4 is an example of the SRv6 packet, and there are a plurality of implementations in which the slice identifier is carried in the SRv6 packet.

In a possible implementation, the slice identifier is carried in a hop-by-hop options header of the SRv6 packet. For example, refer to an optional solution 1 shown in FIG. 4. The SRv6 packet includes the hop-by-hop options header, and the hop-by-hop options header includes the slice identifier of the network slice. Optionally, the slice identifier occupies 32 bits in the hop-by-hop options header.

Figure 5:
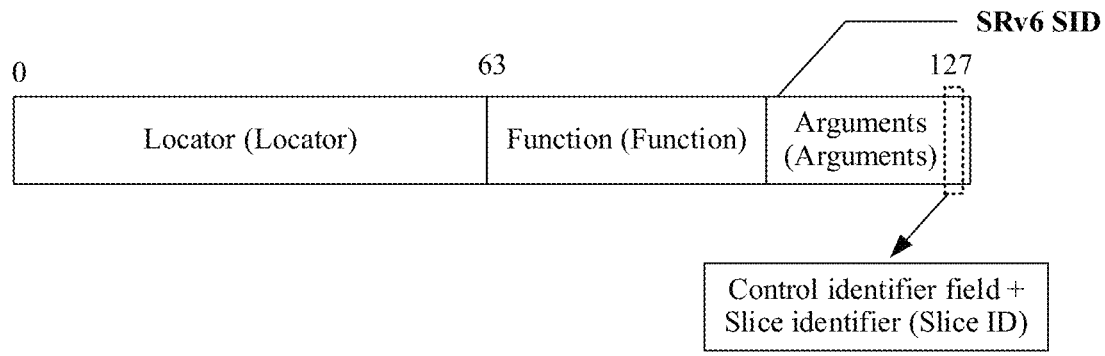
FIG. 5 is a schematic diagram of an SRv6 SID according to an embodiment of this application.

In a possible implementation, the slice identifier is carried in a segment routing header (SRH) of the SRv6 packet. For example, refer to an optional solution 2 shown in FIG. 4. The SRv6 packet includes the SRH, the SRH includes a tag field, and the tag field includes the slice identifier of the network slice. Optionally, the slice identifier occupies 16 bits in the tag field. For another example, refer to an optional solution 3 shown in FIG. 4. The SRv6 packet includes the SRH, and the SRH includes a segment list. The segment list includes at least one SRv6 segment ID (SID), and the SRv6 SID includes the slice identifier. Optionally, refer to FIG. 5. The SRv6 SID includes a locator part, a function part, and an argument part, and the argument part of the SRv6 SID includes the slice identifier of the network slice. For another example, refer to an optional solution 4 shown in FIG. 4. The SRv6 packet includes the SRH, the SRH includes a TLV, and the TLV of the SRH includes the slice identifier of the network slice. Optionally, the slice identifier occupies 32 bits in the TLV of the SRH.

In a possible implementation, the slice identifier is carried in an outer IPv6 packet header of the SRv6 packet. For example, refer to FIG. 4. The SRv6 packet includes the IPv6 packet header (also referred to as an IPv6 basic packet header), the IPv6 packet header includes a flow label, and the flow label includes the slice identifier of the network slice. Optionally, the slice identifier occupies N bits in the flow label. N is a positive integer. For example, N is 8.

Case 2: The packet is the MPLS packet or the SR-MPLS packet.

Figure 6:
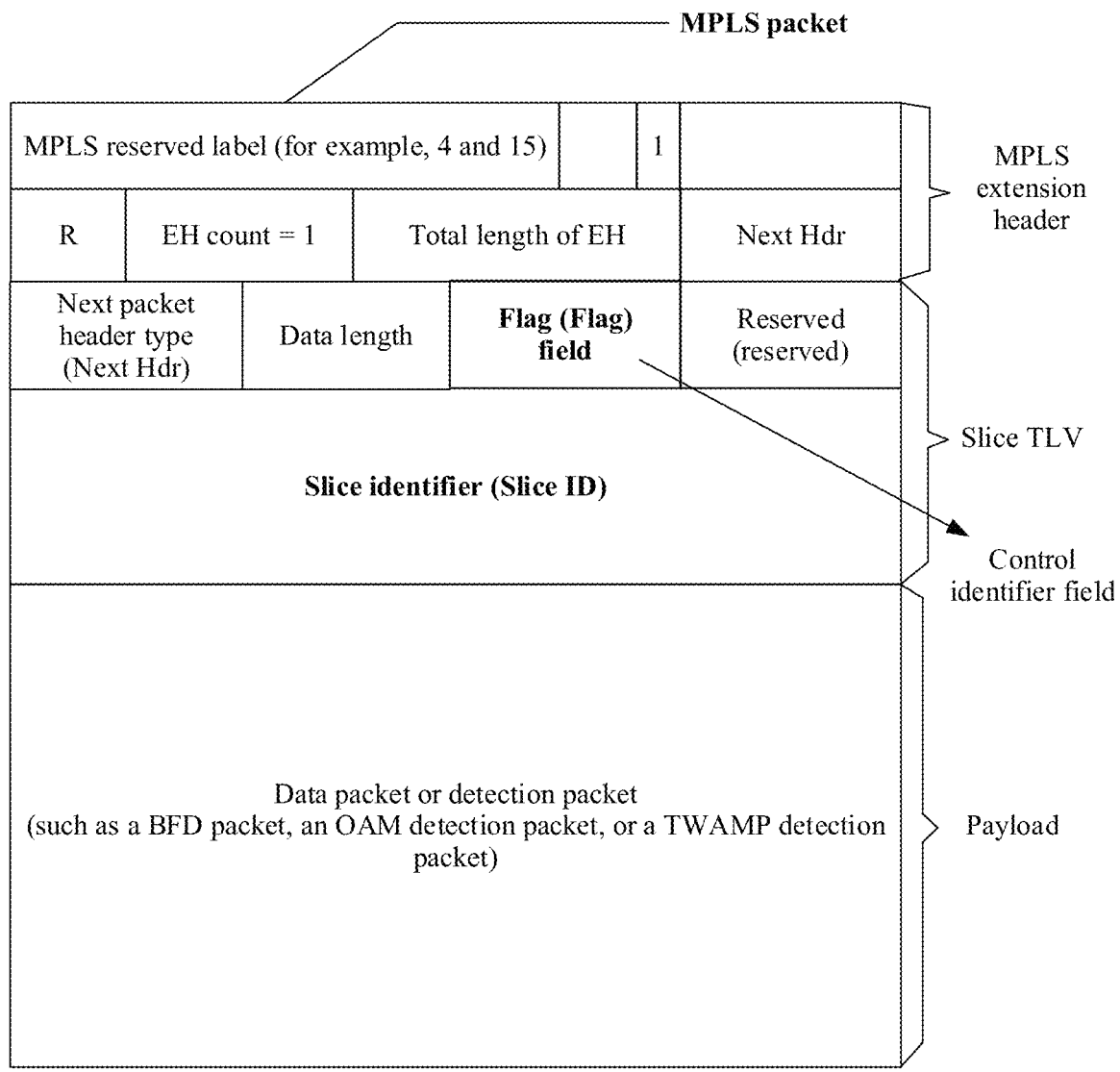
FIG. 6 is a schematic diagram of an MPLS packet according to an embodiment of this application.

The MPLS packet or the SR-MPLS packet includes an MPLS reserved label and a structure following the reserved label, and the structure following the reserved label includes the slice identifier. FIG. 6 illustrates the MPLS packet by using an example. The MPLS packet includes an MPLS extension header, a slice TLV, and a payload. The MPLS extension header includes an MPLS reserved label. The slice TLV is an example of a structure following the reserved label. The slice TLV includes the slice identifier.

EH in FIG. 6 represents an extension header, namely, an extension header, which is a general extension header of the MPLS. Next Hdr is an abbreviation of a next header, and a value of the Next Hdr field indicates the next header. In encapsulation shown in this embodiment, the value of Next Hdr may be oxff, namely, UL. If the value of Next Hdr is oxff, it indicates that a slice identifier information head is followed by no other extension header. A type of a payload in an MPLS payload is obtained from the last valid MPLS label. In addition, the MPLS packet or the SR-MPLS packet may further include a hop count field.

Case 3: The packet is the IPv6 packet.

Figure 7:
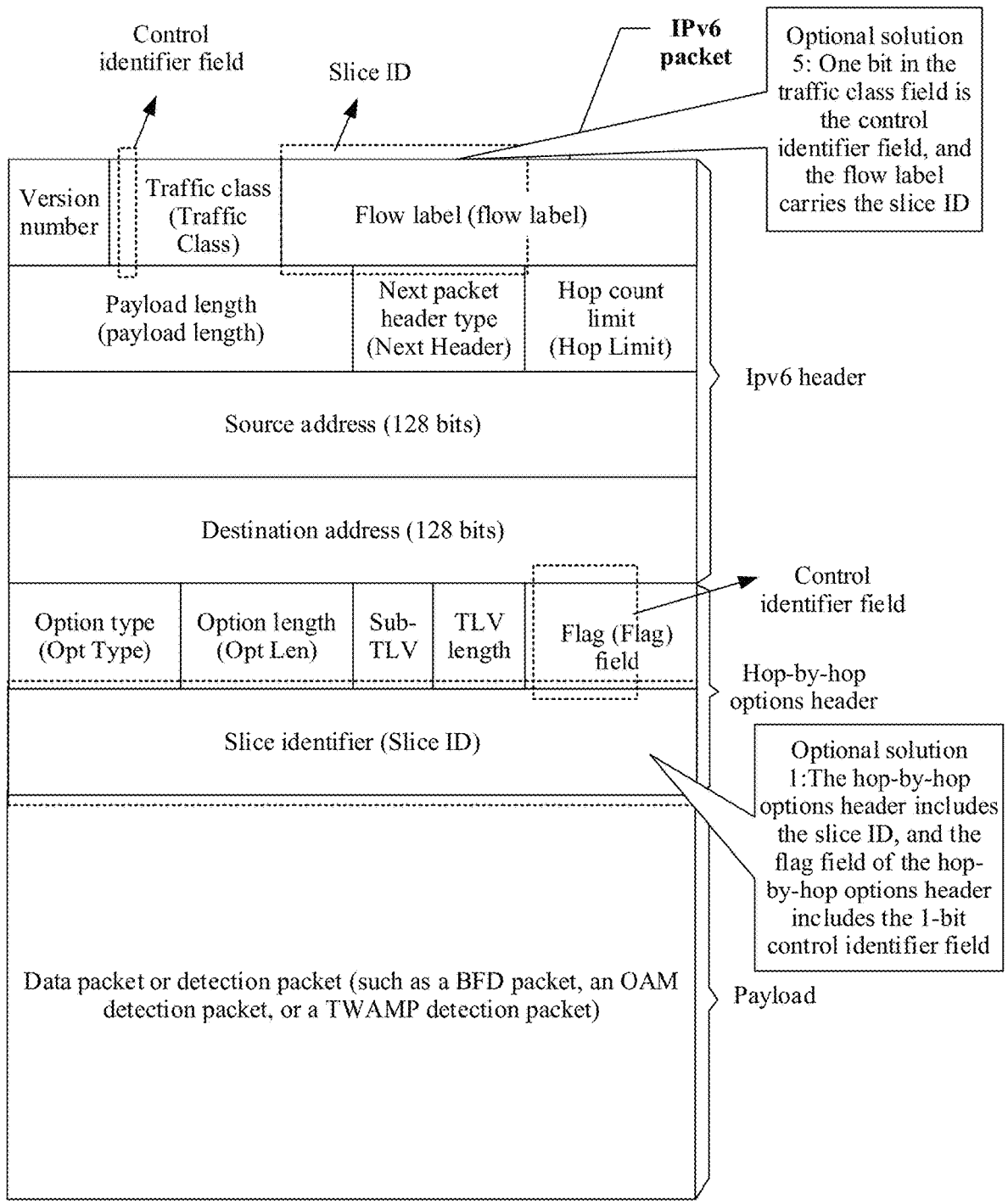
FIG. 7 is a schematic diagram of an IPv6 packet according to an embodiment of this application.

Optionally, the packet is not the SRv6 packet, the MPLS packet, or the SR-MPLS packet, but a conventional IPv6 packet. For example, FIG. 7 is an example of the conventional IPv6 packet, and there are a plurality of implementations in which the slice identifier is carried in the IPv6 packet. For example, the slice identifier is carried in a hop-by-hop options header of the IPv6 packet. For another example, the slice identifier is carried in an IPv6 packet header (for example, a flow label) of the IPv6 packet. For specific details of the two manners, refer to the foregoing descriptions of the optional solution 1 and the optional solution 5.

It should be understood that a location and a length of each field in FIG. 4 to FIG. 7 are merely examples. For example, one row in FIG. 4 represents 32 bits, and a field whose length is greater than 32 bits may occupy a plurality of rows in FIG. 4. For example, a source address and a destination address in the IPv6 packet header are 128 bits, and the source address and the destination address may occupy four rows in FIG. 4. FIG. 4 does not show a meaning of occupying a plurality of rows.

The control identifier field is also referred to as a mandatory match flag, an M flag, or an M flag. The control identifier field may be used as an attribute of the slice identifier. The control identifier field indicates whether forwarding of the packet is allowed when a resource corresponding to the slice identifier fails to be matched. A behavior of forwarding the packet by a receive end (for example, the first network device in this embodiment) of the packet can be controlled by using the control identifier field. When the control identifier field exists, the receive end is required to forward the packet only after finding the resource corresponding to the slice identifier. If the receive end cannot find the resource corresponding to the slice identifier before forwarding the packet, the receive end discards the packet. When the control identifier field does not exist, if the receive end cannot find the resource corresponding to the slice identifier, the receive end forwards the packet based on routing information. In other words, the control identifier field indicates "must be matched".

A location relationship between the slice identifier and the control identifier field include a plurality of possible cases. The following uses Case A and Case B as examples for description.

Case A: The control identifier field is added to a structure that carries the slice identifier. In other words, the control identifier field and the slice identifier are located in a same structure in the packet. The structure is, for example, a TLV, a sub-TLV, or a packet header. When the structure is the TLV, the TLV is, for example, a slice TLV. For example, both the control identifier field and the slice identifier are located in a value field of the slice TLV in the packet.

Case B: A structure other than a structure carrying the slice identifier includes the control identifier field.

A resource includes but is not limited to at least one of a reserved resource or an on-demand allocated resource. The reserved resource is a forwarding resource reserved for the network slice. The forwarding resource is a resource that needs to be used by a forwarding node (for example, the first network device in this embodiment) to forward the packet. For example, the forwarding resource includes a slot, an entity quality of service (QoS) queue, a port, a forwarding table resource, a queue buffer, a CPU, a bandwidth, and a FlexE interface. The reserved resource is pre-allocated by a controller, or the reserved resource is statically configured by a user through a manual operation. The network slice and the reserved resource may be in a many-to-one relationship. For example, a same reserved resource is planned for a plurality of network slices. Alternatively, the network slice and the reserved resource may be in a one-to-one correspondence. For example, a unique corresponding reserved resource is planned for each network slice, and different network slices corresponds to different reserved resources. Alternatively, the network slice and the reserved resource may be in a one-to-many relationship. For example, a plurality of reserved resources are planned for one network slice. Optionally, the reserved resource is a forwarding resource reserved for all packets in the network slice. Alternatively, the reserved resource is a forwarding resource reserved for a part of packets in the network slice, for example, a forwarding resource reserved for one or more specific packets. The on-demand allocated resource may be a resource dynamically applied for by the forwarding node (for example, the first network device in this embodiment) for the network slice.

How the control identifier field is carried in the packet includes a plurality of implementations. The following describes, with reference to Case 1 to Case 3, optional solutions of including the control identifier field by using examples. It should be understood that the following described Case 1 to Case 3 in which the control identifier field is carried correspond to the foregoing described Case 1 to Case 3 in which the slice identifier is carried. Specific details may be mutually referenced.

Case 1: The packet is the SRv6 packet.

FIG. 4 is an example of the SRv6 packet, and there are a plurality of implementations in which the control identifier field is carried in the SRv6 packet.

In a possible implementation, the control identifier field is carried in a hop-by-hop options header of the SRv6 packet. For example, refer to the optional solution 1 shown in FIG. 4. The SRv6 packet includes the hop-by-hop options header, the hop-by-hop options header includes a flag field, and the flag field of the hop-by-hop options header includes the control identifier field. Optionally, the control identifier field occupies one bit in the flag field of the hop-by-hop options header.

In a possible implementation, the control identifier field is carried in an SRH of the SRv6 packet. For example, refer to the optional solution 2 shown in FIG. 4. The SRv6 packet includes the SRH, the SRH includes the flag field, and the flag field includes the control identifier field. Optionally, the control identifier field may occupy one bit in the flag field of the SRH. For another example, refer to the optional solution 3 shown in FIG. 4. The SRv6 packet includes the SRH, the SRH includes a segment list, the segment list includes at least one SRv6 SID, and the SRv6 SID includes the control identifier field. Optionally, refer to FIG. 5. An argument part of the SRv6 SID includes the control identifier field. The control identifier field may occupy one bit in the SRv6 SID. For another example, refer to the optional solution 4 shown in FIG. 4. The SRv6 packet includes the SRH, the SRH includes a TLV, and the TLV of the SRH includes the control identifier field of the network slice. Optionally, the TLV of the SRH includes a flag field, and the flag field includes the control identifier field. The control identifier field may occupy one bit in the TLV of the SRH.

In a possible implementation, the control identifier field is carried in an outer IPv6 packet header of the SRv6 packet. For example, refer to FIG. 4. The SRv6 packet includes an IPv6 packet header, the IPv6 packet header includes a traffic class field, the traffic class field includes the control identifier field, and the control identifier field occupies one bit in the traffic class field.

It should be understood that whether the packet is a data packet or a detection packet is not limited in Case 1 in this embodiment. Optionally, the packet is an SRv6 data packet. For example, refer to FIG. 4. A payload of the SRv6 packet may include the data packet. Optionally, the packet is an SRv6 detection packet. For example, refer to FIG. 4. A payload of the SRv6 packet may include the detection packet. There may be a plurality of types of detection packets in the payload of the SRv6 packet. For example, the payload of the SRv6 packet includes a BFD packet, an OAM detection packet, or a TWAMP detection packet.

In Case 1, the slice identifier and the control identifier field are carried in the SRv6 packet. In a process of forwarding the SRv6 packet, the forwarding nodes may parse the SRv6 packet to transmit the slice identifier and the control identifier field to each other.

Case 2: The packet is the MPLS packet or the SR-MPLS packet.

The MPLS packet or the SR-MPLS packet includes an MPLS reserved label and a structure following the reserved label, and the structure following the reserved label includes the control identifier field. Refer to FIG. 6, the structure that is of the MPLS packet and that follows the reserved label is, for example, a slice TLV, the slice TLV includes a flag field, and the flag field includes the control identifier field. Optionally, the control identifier field occupies one bit in the structure following the reserved label.

It should be understood that whether the packet is a data packet or a detection packet is not limited in Case 2 in this embodiment. Optionally, the packet is an MPLS data packet. For example, refer to FIG. 4. A payload of the MPLS packet may include the data packet. Optionally, the packet is an MPLS detection packet. For example, refer to FIG. 4. A payload of the MPLS packet may include the detection packet. There may be a plurality of types of detection packets in the payload of the MPLS packet. For example, the payload of the MPLS packet includes a BFD packet, an OAM detection packet, or a TWAMP detection packet.

In Case 2, the slice identifier and the control identifier field are carried in the MPLS packet. In a process of forwarding the MPLS packet, the forwarding nodes may parse the MPLS packet to transmit the slice identifier and the control identifier field to each other.

Case 3: The packet is the IPv6 packet.

For example, refer to FIG. 7. The control identifier field is carried in the IPv6 packet. For example, the control identifier field is carried in a hop-by-hop options header of the IPv6 packet. For another example, the control identifier field is carried in an IPv6 packet header (for example, a flow label) of the IPv6 packet.

It should be understood that whether the packet is a data packet or a detection packet is not limited in Case 3 in this embodiment. A payload of the IPv6 packet may include the data packet, or may include the detection packet such as a BFD packet, an OAM detection packet, or a TWAMP detection packet.

In Case 3, if the forwarding node does not support a forwarding function of SR and a forwarding function of MPLS, and the forwarding node supports a forwarding function of IPv6, the forwarding node can transmit the control identifier field and the slice identifier by using the IPv6 packet described in Case 3.

It should be further understood that the foregoing Case 1 to Case 3 are merely examples for description, and do not represent mandatory implementations of carrying the slice identifier and the control identifier field. In some other embodiments, the slice identifier and the control identifier field may alternatively be carried in another implementation. For example, the slice identifier and the control identifier field are carried in a slice identifier information head of the packet. For another example, the slice identifier and the control identifier field are carried in an IPv4 packet header. Specifically, the packet includes an IPv4 packet, the IPv4 packet includes the IPv4 packet header, and the IPv4 packet header includes the slice identifier and the control identifier field. For another example, the slice identifier and the control identifier field are carried in a payload of the packet. Specifically, the packet includes the payload, the payload includes a structure such as a TLV, and the structure includes the slice identifier and the control identifier field. For example, the packet is a virtual extensible local area network (VXLAN) packet, a payload of the VXLAN packet includes a UDP packet header, and the UDP packet header includes the slice identifier and the control identifier field. For example, the UDP packet header includes a TLV (for example, a slice TLV), and a value field of the TLV includes the slice identifier and the control identifier field.

Optionally, the control identifier field occupies one bit of the packet, and a value of the bit indicates whether a receive end is allowed to forward the packet when a resource corresponding to the slice identifier fails to be matched. If the bit is set, it indicates that forwarding of the packet is not allowed when the resource corresponding to the slice identifier fails to be matched. If the bit is not set, it indicates that forwarding of the packet is allowed when the resource corresponding to the slice identifier fails to be matched. That the bit is set means that, for example, a value of the bit is 1, and that the bit is not set means that, for example, the value of the bit is 0.

From a perspective of a type of the payload of the packet, there are a plurality of cases for the packet that carries the control identifier field and the slice identifier. The following uses Case I and Case II as examples for description.

Case I: The packet includes a detection packet.

The detection packet is used to detect at least one of a connectivity parameter or a transmission performance parameter of a path corresponding to the network slice. The transmission performance parameter includes at least one of a delay, a packet loss rate, jitter, real-time traffic, a packet quantity, or a byte quantity. There are a plurality of cases for a type of the detection packet. For example, in a BFD detection scenario, the detection packet is a BFD packet. The second network device is an initiator of BFD detection, and includes the control identifier field and the slice identifier in the BFD packet, so that the BFD packet includes the control identifier field and the slice identifier. For another example, in an OAM detection scenario, the detection packet is an OAM packet, and the second network device includes the control identifier field and the slice identifier in the OAM packet, so that the OAM packet includes the control identifier field and the slice identifier. For example, the OAM detection packet is a round trip time (calculated round trip time (RTT)) OAM detection packet. For another example, in a TWAMP detection scenario, the detection packet is a TWAMP packet, and the second network device includes the control identifier field and the slice identifier in the TWAMP packet, for example, includes a control identifier in a flag field in a structure of the slice identifier in the TWAMP packet, so that the TWAMP packet includes the control identifier field and the slice identifier. Certainly, the detection packet may be another detection packet other than the BFD packet, the OAM detection packet, and the TWAMP packet. For example, the detection packet is an iFit packet, and the iFit packet includes the control identifier field and the slice identifier. When the packet is the detection packet, a specific type of the detection packet is not limited in this embodiment.

Case II: The packet includes a data packet.

The data packet is used to carry service data of the network slice, and the data packet includes the control identifier field and the slice identifier. Optionally, if the packet is the data packet, the first network device determines, based on a service type of the service data carried in the data packet, whether to include the control identifier field in the data packet. For example, if the service type corresponding to the data packet is a high-value service (where the high-value service is, for example, a service whose priority meets a condition), the first network device includes the control identifier field in the data packet, to ensure that the data packet is forwarded by using a corresponding resource on each forwarding node. Otherwise, the data packet is discarded. For example, if the service type corresponding to the data packet is a common service (where the common service is, for example, a service whose priority does not meet a condition), the first network device does not include the control identifier field in the data packet. If a part of links do not have corresponding resources, the data packet continues to be forwarded, to ensure service connectivity. In this way, for different service types, the first network device flexibly selects, based on a service requirement, whether to include the control identifier field, to meet an SLA requirement.

Manners of generating the packet in S101 optionally include a plurality of implementations. The following uses Case (1) and Case (2) as examples to describe the manners of generating the packet.

Case (1): The second network device receives an original packet from an upstream device, and generates, based on the original packet, the packet that includes the control identifier field and the slice identifier. The upstream device is, for example, a terminal or a previous-hop network device. Optionally, in Case (1), the slice identifier is added by the upstream device. Specifically, the original packet includes the slice identifier of the network slice. The second network device obtains the slice identifier from the original packet, and adds the control identifier field, to generate the packet. Alternatively, in Case (1), the slice identifier is added by the second network device. Specifically, the second network device identifies the network slice corresponding to the original packet, and the second network device determines the slice identifier corresponding to the network slice, and adds the control identifier field and the slice identifier, to generate the packet.

Optionally, the packet sent by the second network device includes partial content (for example, service data carried in the original packet) of the original packet, and other partial content of the original packet is changed. For example, after receiving the original packet, the second network device updates partial content in the original packet, for example, modifies, deletes, or adds data (for example, modifies a MAC address) of a packet header of the original packet, and encapsulates an updated original packet, the control identifier field, and the slice identifier, to obtain and send the packet. Therefore, the packet sent by the second network device includes the partial content of the original packet, the control identifier field, and the slice identifier. Alternatively, the packet sent by the second network device includes all content of the original packet. For example, the second network device does not update the received original packet, but encapsulates the control identifier field, the slice identifier, and other optional information to obtain and send the packet. In this case, the packet sent by the second network device includes all content of the original packet, the control identifier field, and the slice identifier.

Case (2): The second network device does not perform S101 based on an original packet sent by another device, but assembles and generates the entire packet by itself. For example, in a BFD detection scenario, the second network device may assemble and generate an entire BFD packet by itself.

S102: The second network device sends the packet.

S103: The first network device receives the packet.

S104: The first network device fails to match the resource corresponding to the slice identifier.

The first network device obtains routing information through querying based on a destination address of the packet, finds a physical outbound interface indicated by the routing information, and matches a resource on the physical outbound interface based on the slice identifier. However, in many cases, the first network device may not find the resource. For example, the first network device does not configure a mapping relationship between the slice identifier and the resource. Because the mapping relationship between the slice identifier and the resource cannot be found, the first network device fails to match the resource. For example, a resource corresponding to a slice identifier 1 is a slot on a physical outbound interface A, but the first network device does not configure the slice identifier 1 on the physical outbound interface A. Therefore, the first network device fails to match the slot on the physical outbound interface A based on the slice identifier 1. For another example, the resource corresponding to the slice identifier is in a faulty state, and therefore the first network device fails to match the resource. For example, the resource corresponding to the slice identifier 1 is the slot on the physical outbound interface A, but the physical outbound interface A of the first network device is faulty. Therefore, the first network device fails to match the slot on the physical outbound interface A based on the slice identifier 1.

S105: If a value of the control identifier field indicates that forwarding of the packet is not allowed when the resource corresponding to the slice identifier fails to be matched, the first network device discards the packet.

The first network device identifies the control identifier field, and determines whether the control identifier field allows forwarding of the packet when the resource corresponding to the slice identifier fails to be matched. If the value of the control identifier field indicates that forwarding of the packet is not allowed when the resource corresponding to the slice identifier fails to be matched, the first network device discards the packet. For example, when the control identifier field occupies one bit, the first network device determines whether the bit is set. If the bit is set, for example, a value of the bit is "1", the first network device discards the packet.

In addition, if the value of the control identifier field indicates that forwarding of the packet is allowed when the resource corresponding to the slice identifier fails to be matched, the first network device forwards the packet based on the routing information. For example, when the control identifier field occupies one bit, the first network device determines whether the bit is not set. If the bit is not set, for example, the value of the bit is "0", the first network device forwards the packet based on the routing information.

For example, refer to FIG. 2. If the forwarding node 201 (namely, the first network device) finds that an outbound interface of the routing information is the path a, and matches the resource corresponding to the slice identifier, the forwarding node 201 forwards the packet to the forwarding node 203 by using the resource, so that the packet is transmitted on the path a. If the forwarding node 201 does not match the resource corresponding to the slice identifier, and the value of the control identifier field indicates that forwarding of the packet is not allowed when the resource corresponding to the slice identifier fails to be matched, the forwarding node 201 discards the packet. If the forwarding node 201 finds that the outbound interface of the routing information is the path b, and fails to match the resource corresponding to the slice identifier, and the value of the control identifier field indicates that forwarding the packet is allowed when the resource corresponding to the slice identifier fails to be matched, the forwarding node 201 forwards the packet based on the routing information, and transmit the packet to the forwarding node 203, so that the packet is transmitted on the path b.

The following S106 and S107 are optional steps, and the following S106 and S107 are applicable to a case in which the packet is the detection packet. In some other embodiments, S106 and S107 are not performed.

S106: The second network device determines that the packet is discarded.

When the packet is the detection packet, because the first network device discards the detection packet, transmission of the detection packet at the first network device is interrupted. Therefore, the detection packet is not transmitted to a target node. Because the target node of the detection packet does not receive the detection packet, the target node does not return a response packet to the first network device. If the first network device does not receive the response packet of the target node due to timeout, that the detection packet is discarded is determined. For example, in the BFD detection scenario, because the BFD packet is discarded by the first network device, and the second network device does not receive a returned loopback seamless bidirectional forwarding detection (SBFD) packet before a timer times out, the second network device maintains a local state in a down state, and that the BFD packet is discarded is determined.

S107: In response to a case in which the packet is discarded, the second network device performs a processing action used to ensure a service SLA.

When triggered by the packet loss event, the second network device may perform one or more processing actions to ensure the service SLA. How the second network device ensures the service SLA by performing the processing action includes a plurality of implementations. The following uses Implementation 1 and Implementation 2 as examples for description.

Implementation 1: In response to the case in which the packet is discarded, the second network device switches the path corresponding to the network slice.

For example, the second network device switches the path corresponding to the network slice from a primary path to a standby path. The primary path is a path planned for the network slice in advance, and the primary path is, for example, a packet transmission path in S102 and S103. The standby path is also a path that is planned in advance and that corresponds to the network slice. The standby path is used to protect the primary path. For example, two paths are planned for the network slice in advance. Bandwidths of the two paths are greater than a bandwidth threshold; or delays of the two paths are less than a delay threshold. One path is the primary path, and the other path is the standby path. Optionally, the standby path has a same ingress node as the primary path. For example, in this embodiment, an ingress node of the primary path is the second network device, and an ingress node of the standby path is also the second network device.

Optionally, Implementation 1 is performed when the packet is the BFD packet. For example, the ingress node (for example, the second network device) sets the control identifier field in the BFD detection packet. When an intermediate link fails to be matched, the BFD detection packet is discarded. Because the BFD detection packet is discarded, the ingress node triggers service switchover, to ensure the service SLA.

For example, Implementation 1 is performed when the packet is the OAM detection packet. For example, when sending the OAM detection packet, the ingress node (for example, the second network device) sets the control identifier field. In a process of forwarding the OAM detection packet, if an intermediate node (for example, the first network device) fails to match the resource corresponding to the slice identifier, the intermediate node discards the OAM detection packet. Because the OAM detection packet is discarded, the ingress node detects that the service SLA cannot be ensured in a part of links on the network, and it indicates that the network needs to be adjusted.

Implementation 2: In response to the case in which the packet is discarded, the second network device sends an alarm message.

Optionally, the second network device sends the alarm message to the controller on the network. The controller performs, in response to the alarm message, fault detection on the path corresponding to the network slice. For example, the path corresponding to the network slice is a path having a reserved resource. For example, the controller compares an actual forwarding path of the packet with the path having the reserved resource, and the controller determines whether a node or a link of the actual forwarding path of the packet is consistent with a node or a link of the path having the reserved resource. The controller determines a fault point in the path having the reserved resource based on inconsistent nodes or links in the two paths, to accurately locate a node or a link on which a fault occurs. In addition, optionally, the controller performs, in response to the alarm message, fault rectification on the path corresponding to the network slice. For example, the controller first determines the fault point through the fault detection, and then rectifies the fault point.

In Implementation 2, because the packet is discarded by the intermediate node (the first network device), the ingress node (the second network device) reports the alarm message in a more timely manner, so that a case in which the fault has occurred on the path corresponding to the network slice is found in a timely manner. Because the controller can perform the fault detection and the fault rectification under triggering of the alarm message, the fault of the path corresponding to the network slice can be rectified in a timely manner, and a service is prevented from being affected for a long time.

The foregoing Implementation 1 and Implementation 2 may be combined in any manner. Optionally, the second network device performs only one of the two implementations. For example, after the second network device determines that the packet is discarded, the second network device determines whether the standby path exists for the path corresponding to the network slice. If the standby path exists, the second network device performs Implementation 1. If there is no standby path, the second network device performs Implementation 2. Alternatively, the foregoing Implementation 1 and Implementation 2 are both performed. It should be understood that when Implementation 1 and Implementation 2 are both performed, a time sequence in which the second network device performs Implementation 1 and Implementation 2 is not limited in this embodiment. For example, the second network device may first send the alarm message, and then perform path switching, or the second network device may first perform path switching, and then send the alarm message. Certainly, the second network device may also send the alarm message when performing path switching.

It should be further understood that the foregoing Implementation 1 and Implementation 2 are merely examples for description, and do not represent mandatory implementations of the processing action for ensuring the service SLA. In some other embodiments, the second network device performs a processing action other than path switching or alarm reporting to ensure the service SLA. The another processing action used to ensure the service SLA is a specific case of S107, and should also fall within the protection scope of this embodiment of this application.

Optionally, when the packet is the data packet, in a process of sending the packet, the second network device sends the data packet that carries the control identifier field, and also sends the detection packet that carries the control identifier field. If the second network device determines that the detection packet is discarded, because the detection packet and the data packet are sent together, the second network device determines that the data packet is discarded.

In the method provided in this embodiment, the control identifier field is added to the packet, and the control identifier field indicates whether forwarding of the packet is allowed when the resource corresponding to the slice identifier fails to be matched. The control identifier field and the slice identifier of the network slice are carried in the packet, so that the slice identifier and the control identifier field are transmitted on the network together. When the receive end fails to match the resource corresponding to the slice identifier, the receive end can discard the packet based on the control identifier field, instead of forwarding the packet by using the routing information, to avoid a problem that the SLA cannot be ensured when the packet enters a path corresponding to the routing information on the way.

Especially, when protection switching is triggered by detecting the packet loss, because the packet is discarded by the intermediate node, the ingress node detects the packet loss. Therefore, the ingress node performs path switching in a timely manner, to improve reliability and help the ingress node detect a service impairment cause in a timely manner.

The foregoing describes the packet processing method in embodiments of this application, and the following describes a packet processing apparatus in embodiments of this application. It should be understood that the packet processing apparatus has any function of the first network device in the foregoing method.

Figure 8:
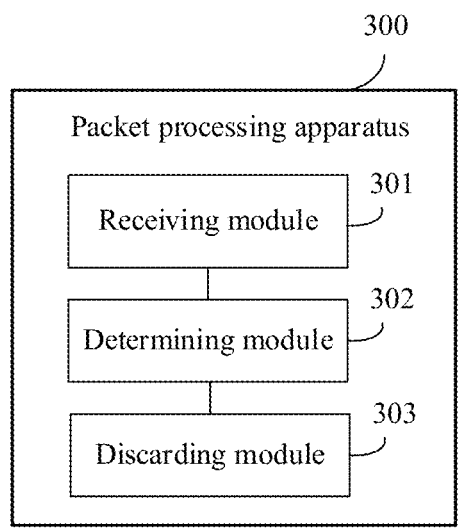
FIG. 8 is a schematic diagram of a structure of a packet processing apparatus 300 according to an embodiment of this application.

FIG. 8 is a schematic diagram of a structure of a packet processing apparatus 300 according to an embodiment of this application. As shown in FIG. 8, the packet processing apparatus 300 includes: a receiving module 301, configured to perform S103; a determining module 302, configured to perform S104; and a discarding module 303, configured to perform S105.

It should be understood that the packet processing apparatus 300 corresponds to the first network device in the foregoing method embodiments, and the modules in the packet processing apparatus 300 and the foregoing other operations and/or functions are separately used to implement the steps and the methods implemented by the first network device in the method embodiments. For specific details, refer to the foregoing method embodiments. For brevity, details are not described herein again.

It should be understood that when the packet processing apparatus 300 processes a packet, division of the foregoing functional modules is merely used as an example for description. In actual application, the foregoing functions may be allocated to different functional modules for implementation based on a requirement, that is, an internal structure of the packet processing apparatus 300 is divided into different functional modules, to implement all or some of the functions described above. In addition, the packet processing apparatus 300 provided in the foregoing embodiment pertains to a same concept as the foregoing packet processing method embodiments. For a specific implementation process of the packet processing apparatus 300, refer to the method embodiments. Details are not described herein again.

Figure 9:
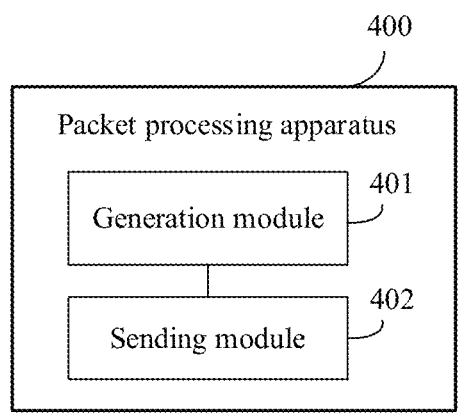
FIG. 9 is a schematic diagram of a structure of a packet processing apparatus 400 according to an embodiment of this application.

FIG. 9 is a schematic diagram of a structure of a packet processing apparatus 400 according to an embodiment of this application. As shown in FIG. 9, the packet processing apparatus 400 includes: a generation module 401, configured to perform Sim; and a sending module 402, configured to perform S102.

It should be understood that the packet processing apparatus 400 corresponds to the second network device in the foregoing method embodiments, and the modules in the packet processing apparatus 400 and the foregoing other operations and/or functions are separately used to implement the steps and the methods implemented by the second network device in the method embodiments. For specific details, refer to the foregoing method embodiments. For brevity, details are not described herein again.

It should be understood that when the packet processing apparatus 400 processes a packet, division of the foregoing functional modules is merely used as an example for description. In actual application, the foregoing functions may be allocated to different functional modules for implementation based on a requirement, that is, an internal structure of the packet processing apparatus 400 is divided into different functional modules, to implement all or some of the functions described above. In addition, the packet processing apparatus 400 provided in the foregoing embodiment pertains to a same concept as the foregoing packet processing method embodiments. For a specific implementation process of the packet processing apparatus 400, refer to the method embodiments. Details are not described herein again.

Corresponding to the method embodiments and the virtual apparatus embodiments provided in this application, embodiments of this application further provide a network device. The following describes a hardware structure of the network device.

The network device 500 corresponds to the first network device or the second network device in the foregoing method embodiments. Hardware, modules, and the foregoing other operations and/or functions in the network device 500 are separately used to implement the steps and the methods implemented by the first network device or the second network device in the method embodiments. For a detailed procedure of how the network device 500 processes a packet, refer to the foregoing method embodiments. For brevity, details are not described herein again. The steps in Embodiment 1 are completed by using an integrated logic circuit of hardware in a processor in the network device 500 or instructions in a form of software. The steps of the method disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with the hardware of the processor. To avoid repetition, details are not described herein again.

The network device 500 corresponds to the packet processing apparatus 300 or the packet processing apparatus 400 in the foregoing virtual apparatus embodiment, and each functional module in the packet processing apparatus 300 or the packet processing apparatus 400 is implemented by using software in the network device 500. In other words, the functional modules included in the packet processing apparatus 300 or the packet processing apparatus 400 are generated after the processor in the network device 500 reads program code stored in the memory.

Figure 10:
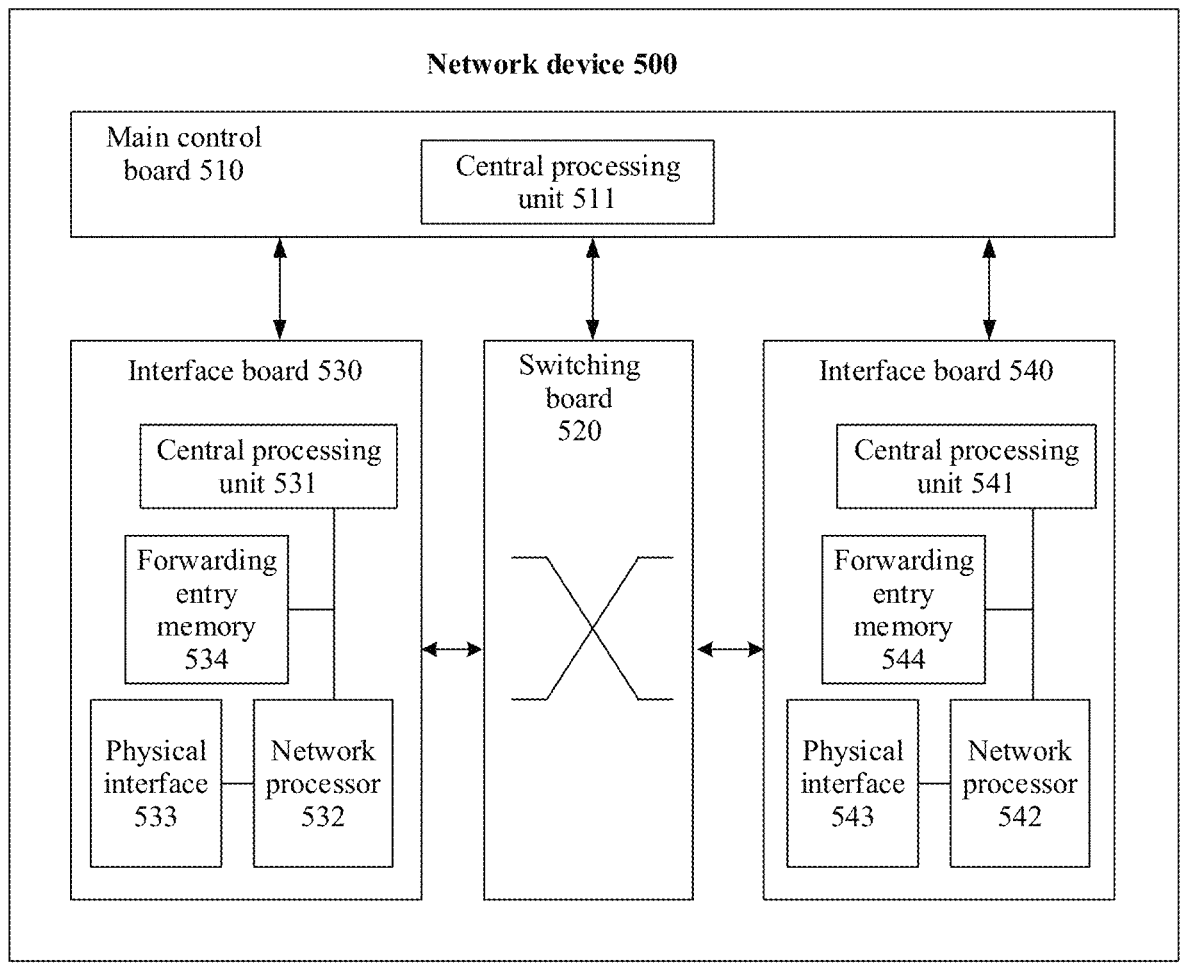
FIG. 10 is a schematic diagram of a structure of a network device 500 according to an embodiment of this application.

FIG. 10 is a schematic diagram of a structure of the network device 500 according to an example embodiment of this application. The network device 500 may be configured as a first network device or a second network device.

The network device 500 includes a main control board 510, an interface board 530, a switching board 520, and an interface board 540. The main control board 510 is configured to complete functions such as system management, device maintenance, and protocol processing. The switching board 520 is configured to complete data exchange between interface boards (the interface boards are also referred to as line cards or service boards). The interface board 530 and the interface board 540 are configured to provide various service interfaces (for example, an Ethernet interface and a POS interface) and forward a data packet. The main control board 510, the interface board 530, the interface board 540, and the switching board 520 are connected to a system backplane by using a system bus to implement interworking. A central processing unit 531 on the interface board 530 is configured to control and manage the interface board, and communicate with a central processing unit 511 on the main control board 510.

At least one of the central processing unit 531 on the interface board 530, the central processing unit 511 on the main control board 510, or a network processor 532 in the network device 500 corresponds to the processor, and at least one of a physical interface 533 on the interface board 530 or a physical interface 543 on the interface board 540 in the network device 500 corresponds to a communication interface.

If the network device 500 is configured as the first network device, the physical interface 533 (or the physical interface 543) receives a packet, and sends the packet to the network processor 532. The network processor 532 queries a forwarding entry memory 534. If a resource corresponding to a slice identifier fails to be matched, the packet is discarded.

It should be understood that the receiving module 301 in the packet processing apparatus 300 is equivalent to the physical interface 533 (or the physical interface 543) in the network device 500, and the determining module 302 and the discarding module 303 in the packet processing apparatus 300 may be equivalent to the network processor 532 or the central processing unit 531.

If the network device 500 is configured as the second network device, the network processor 532 generates a packet, and sends the packet through the physical interface 533 (or the physical interface 543) based on information such as an outbound interface after completing link layer package.

It should be understood that the generation module 401 in the packet processing apparatus 400 may be equivalent to the network processor 532 or the central processing unit 531. The sending module 402 in the packet processing apparatus 400 is equivalent to the physical interface 533 (or the physical interface 543) in the network device 500.

It should be understood that, in this embodiment of this application, an operation on the interface board 540 is consistent with an operation on the interface board 530. For brevity, details are not described again. It should be understood that the network device 500 in this embodiment may correspond to the first network device or the second network device in the foregoing method embodiments, the main control board 510, the interface board 530, and/or the interface board 540 in the network device 500 may implement functions and/or various steps implemented by the first network device or the second network device in the foregoing method embodiments. For brevity, details are not described herein again.

It should be noted that there are one or more main control boards, and the plurality of main control boards may include a primary main control board and a standby main control board. There may be one or more interface boards, and a network device having a stronger data processing capability provides more interface boards. There may also be one or more physical interfaces on an interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, data access and processing capabilities of the network device in the distributed architecture are better than that of the device in the centralized architecture. Optionally, a form of the network device may be that there is only one card, that is, there is no switching board, and functions of an interface board and a main control board are integrated into the card. In this case, a central processing unit on the interface board and a central processing unit on the main control board may be combined into one central processing unit on the card, to perform functions obtained after the two are combined. This type of device has low data switching and processing capabilities (for example, a network device such as a low-end switch or a router). A specific architecture that is to be used depends on a specific networking deployment scenario. This is not limited herein.

Figure 11:
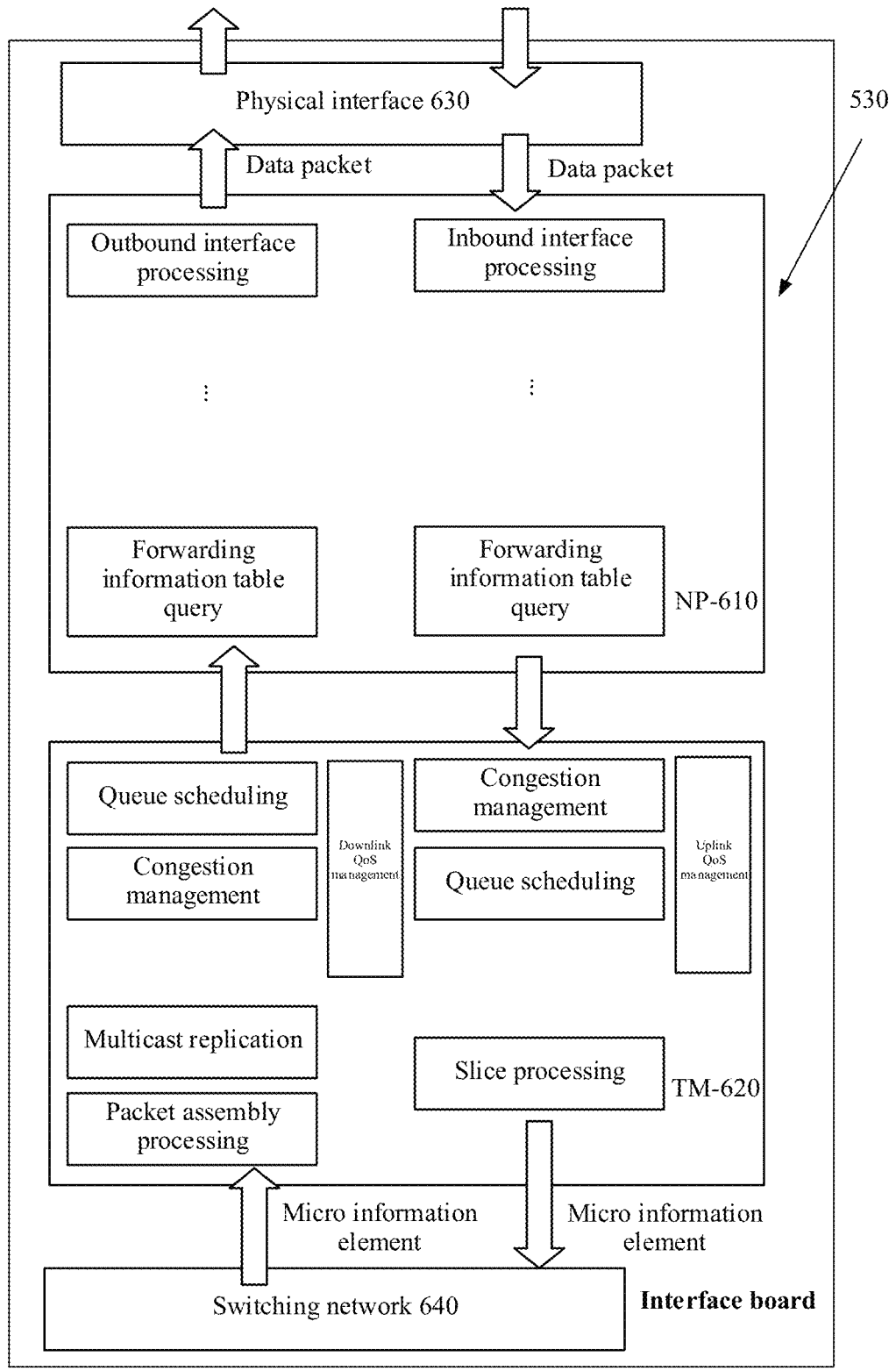
FIG. 11 is a schematic diagram of a structure of an interface board of a network device 500 according to an embodiment of this application.

FIG. 11 is a schematic diagram of a structure of the interface board 530 in the network device shown in FIG. 10 according to an embodiment of this application. The interface board 530 may include a physical interface 630, a network processor (NP) 610, and a traffic management (TM) module 620.

The physical interface is configured to implement an interconnection function at a physical layer. Original traffic enters the interface board of the network device through the physical interface, and a processed packet is sent out through the physical interface.

The network processor (NP) 610 is configured to implement packet forwarding processing. Specifically, processing on an uplink packet includes processing at a packet inbound interface and forwarding information table query, and processing on a downlink packet includes forwarding information table query and the like.

The traffic management (TM) 620 is configured to implement functions such as QoS, line-rate forwarding, large-capacity buffering, and queue management. Specifically, uplink traffic management includes uplink QoS processing (such as congestion management and queue scheduling) and slice processing. Downlink traffic management includes packet assembly processing, multicast replication, and downlink QoS processing (such as congestion management and queue scheduling).

It may be understood that if the network device has a plurality of interface boards 530, the plurality of interface boards 530 may communicate with each other by using a switching network 640.

It should be noted that FIG. 11 shows only schematic processing procedures or modules inside the NP. A processing sequence of modules in specific implementation is not limited thereto. In addition, in actual application, another module or processing procedure may be deployed based on a requirement. This is not limited in this embodiment of this application.

Some embodiments of this application provide a packet processing system. The packet processing system includes a first network device and a second network device. The first network device and the second network device are configured to perform the foregoing packet processing method.

It should be understood that the network devices in the foregoing product forms separately have any function of the first network device or the second network device in the foregoing method embodiments. Details are not described herein.

A person of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, or a network device) to perform all or some of the steps of the method described in embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented through software, hardware, firmware, or any combination thereof. When the software is used to implement the embodiments, all or some of the embodiments may be implemented in a form of a computer program product. The computer program product includes one or more computer program instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method comprising:
   receiving, by a first network device, a packet, wherein the packet comprises a slice identifier of a network slice and a control identifier field, wherein the control identifier field indicates whether forwarding of the packet is allowed when the first network device does not configure the slice identifier on an outbound interface, and wherein the first network device does not configure the slice identifier on the outbound interface; and
   discarding, by the first network device, the packet based on a value of the control identifier field indicating that the forwarding of the packet is not allowed when the first network device does not configure the slice identifier on the outbound interface.

2. The method according to claim 1,
   wherein the packet comprises a flag field, and the flag field comprises the control identifier field, or
   wherein the packet comprises a segment routing over internet protocol version 6 (SRv6) segment identifier (SID), and the SRv6 SID comprises the control identifier field.

3. The method according to claim 1,
   wherein the packet comprises a hop-by-hop options header, and the hop-by-hop options header comprises the control identifier field,
   wherein the packet comprises a segment routing header (SRH), and the SRH comprises the control identifier field,
   wherein the packet comprises a slice identifier information head, and the slice identifier information head comprises the control identifier field,
   wherein the packet comprises an internet protocol version 4 (IPv4) packet header, and the IPv4 packet header comprises the control identifier field,
   wherein the packet comprises an internet protocol version 6 (IPv6) packet header, and the IPv6 packet header comprises the control identifier field, or
   wherein the packet comprises a payload, and a structure in the payload comprises the control identifier field.

4. The method according to claim 1,
   wherein the control identifier field occupies one bit of the packet, and
   wherein the one bit being set indicates that the forwarding of the packet is not allowed when the first network device does not configure the slice identifier on the outbound interface, or wherein the one bit not being set indicates that the forwarding of the packet is allowed when the first network device does not configure the slice identifier on the outbound interface.

5. The method according to claim 1,
   wherein the packet comprises a detection packet, or
   wherein the packet comprises a data packet.

6. The method according to claim 5,
   wherein the packet comprises the detection packet, and wherein the detection packet is a bidirectional forwarding detection (BFD) packet, wherein the detection packet is an operations, administration, and maintenance (OAM) detection packet,
wherein the detection packet is a two-way active measurement protocol (TWAMP) detection packet, or
wherein the detection packet is a channel-associated OAM performance measurement in-situ Flow information Telemetry (iFit) packet based on an internetworking protocol data flow.

7. A method comprising:
generating, by a second network device, a packet, wherein the packet comprises a slice identifier of a network slice and a control identifier field, and wherein the control identifier field indicates whether forwarding of the packet is allowed when a receiver of the packet does not configure the slice identifier on an outbound interface; and
sending, by the second network device, the packet.

8. The method according to claim 7, wherein after the sending, by the second network device, the packet, the method further comprises at least one of:
switching, by the second network device, a path corresponding to the network slice in response to the packet being discarded; or
sending, by the second network device, an alarm message in response to the packet being discarded.

9. The method according to claim 7,
wherein the packet comprises a flag field, and the flag field comprises the control identifier field, or
wherein the packet comprises a segment routing over internet protocol version 6 (SRv6) segment identifier (SID), and the SRv6 SID comprises the control identifier field.

10. The method according to claim 7,
wherein the packet comprises a hop-by-hop options header, and the hop-by-hop options header comprises the control identifier field,
wherein the packet comprises a segment routing header (SRH), and the SRH comprises the control identifier field,
wherein the packet comprises a slice identifier information head, and the slice identifier information head comprises the control identifier field,
wherein the packet comprises an internet protocol version 4 (IPv4) packet header, and the IPv4 packet header comprises the control identifier field,
wherein the packet comprises an internet protocol version 6 (IPv6) packet header, and the IPv6 packet header comprises the control identifier field, or
wherein the packet comprises a payload, and a structure in the payload comprises the control identifier field.

11. The method according to claim 7,
wherein the control identifier field occupies one bit of the packet, and
wherein the one bit being set indicates that the forwarding of the packet is not allowed when the receiver of the packet does not configure the slice identifier on the outbound interface, or wherein the one bit not being set indicates that the forwarding of the packet is allowed when the receiver of the packet does not configure the slice identifier on the outbound interface.

12. The method according to claim 7,
wherein the packet comprises a detection packet, or
wherein the packet comprises a data packet.

13. The method according to claim 12,
wherein the packet comprises the detection packet, and
wherein the detection packet is a bidirectional forwarding detection (BFD) packet,
wherein the detection packet is an operations, administration, and maintenance (OAM) detection packet,
wherein the detection packet is a two-way active measurement protocol (TWAMP) detection packet, or
wherein the detection packet is a channel-associated OAM performance measurement in-situ Flow information Telemetry (iFit) packet based on an internetworking protocol data flow.

14. A first network device, comprising:
a memory storing instructions;
a processor coupled to the memory, wherein when the instructions are executed by the processor, cause the first network device to:
receive a packet, wherein the packet comprises a slice identifier of a network slice and a control identifier field, wherein the control identifier field indicates whether forwarding of the packet is allowed when the first network device does not configure the slice identifier on an outbound interface, and wherein
the first network device does not configure the slice identifier on the outbound interface; and
discard the packet based on a value of the control identifier field indicating that the forwarding of the packet is not allowed when the first network device does not configure the slice identifier on the outbound interface.

15. The first network device according to claim 14,
wherein the packet comprises a flag field, and the flag field comprises the control identifier field, or
wherein the packet comprises a segment routing over internet protocol version 6 (SRv6) segment identifier (SID), and the SRv6 SID comprises the control identifier field.

16. The first network device according to claim 14,
wherein the packet comprises a hop-by-hop options header, and the hop-by-hop options header comprises the control identifier field,
wherein the packet comprises a segment routing header (SRH), and the SRH comprises the control identifier field,
wherein the packet comprises a slice identifier information head, and the slice identifier information head comprises the control identifier field,
wherein the packet comprises an internet protocol version 4 (IPv4) packet header, and the IPv4 packet header comprises the control identifier field,
wherein the packet comprises an internet protocol version 6 (IPv6) packet header, and the IPv6 packet header comprises the control identifier field, or
wherein the packet comprises a payload, and a structure in the payload comprises the control identifier field.

17. The first network device according to claim 14,
wherein the control identifier field occupies one bit of the packet, and
wherein the one bit being set indicates that the forwarding of the packet is not allowed when the first network device does not configure the slice identifier on the outbound interface, or wherein the one bit not being set indicates that the forwarding of the packet is allowed when the first network device does not configure the slice identifier on the outbound interface.

18. The first network device according to claim 14,
wherein the packet comprises a detection packet, or
wherein the packet comprises a data packet.

19. The first network device according to claim 18,
wherein the packet comprises the detection packet, and
wherein the detection packet is a bidirectional forwarding detection (BFD) packet, wherein the detection packet is an operations, administration, and maintenance (OAM) detection packet, wherein the detection packet is a two-way active measurement protocol (TWAMP) detection packet, or wherein the detection packet is a channel-associated OAM performance measurement in-situ Flow information Telemetry (iFit) packet based on an internetworking protocol data flow.

20. A second network device, comprises:
a memory storing instructions;
a processor coupled to the memory, wherein when the instructions are executed by the processor, cause the second network device to:
generate a packet, wherein the packet comprises a slice identifier of a network slice and a control identifier field, wherein the control identifier field indicates whether forwarding of the packet is allowed when a receiver of the packet does not configure the slice identifier on an outbound interface; and
send the packet.

21. The second network device according to claim 20, wherein when the instructions are executed by the processor, further cause the second network device to:
switch, a path corresponding to the network slice in response to the packet being discarded; or
send, an alarm message in response to the packet being discarded.

22. The second network device according to claim 20, wherein the packet comprises a flag field, and the flag field comprises the control identifier field, or
wherein the packet comprises a segment routing over internet protocol version 6 (SRv6) segment identifier (SID), and the SRv6 SID comprises the control identifier field.

23. The second network device according to claim 20, wherein the packet comprises a hop-by-hop options header, and the hop-by-hop options header comprises the control identifier field, wherein the packet comprises a segment routing header (SRH), and the SRH comprises the control identifier field, wherein the packet comprises a slice identifier information head, and the slice identifier information head comprises the control identifier field, wherein the packet comprises an internet protocol version 4 (IPv4) packet header, and the IPv4 packet header comprises the control identifier field, wherein the packet comprises an internet protocol version 6 (IPv6) packet header, and the IPv6 packet header comprises the control identifier field, or wherein the packet comprises a payload, and a structure in the payload comprises the control identifier field.

24. The second network device according to claim 20, wherein the control identifier field occupies one bit of the packet, and
wherein the one bit being set indicates that the forwarding of the packet is not allowed when the receiver of the packet does not configure the slice identifier on the outbound interface, or wherein the one bit not being set indicates that the forwarding of the packet is allowed when the receiver of the packet does not configure the slice identifier on the outbound interface.

25. The second network device according to claim 20, wherein the packet comprises a detection packet, or
wherein the packet comprises a data packet.

26. The second network device according to claim 25, wherein the packet comprises the detection packet, and
wherein the detection packet is a bidirectional forwarding detection (BFD) packet,
wherein the detection packet is an operations, administration, and maintenance (OAM) detection packet,
wherein the detection packet is a two-way active measurement protocol (TWAMP) detection packet, or
wherein the detection packet is a channel-associated OAM performance measurement in-situ Flow information Telemetry (iFit) packet based on an internetworking protocol data flow.

* * * * *

UNITED STATES PATENT AND TRADEMARK OFFICE
CERTIFICATE OF CORRECTION

Page 1 of 1

PATENT NO. : 12,155,568 B2
APPLICATION NO. : 18/528913
DATED : November 26, 2024
INVENTOR(S) : Bao et al.

It is certified that error appears in the above-identified patent and that said Letters Patent is hereby corrected as shown below:

In the Specification

In Column 7, Line 46, delete "boo" and insert --100--.

Signed and Sealed this
Fourteenth Day of January, 2025

Derrick Brent
*Acting Director of the United States Patent and Trademark Office*